July 1, 1930.  E. F. SCHERMERHORN  1,769,651
INSULATED RAIL JOINT
Filed April 2, 1929  2 Sheets-Sheet 1

Inventor
E. F. Schermerhorn,

WITNESSES:-

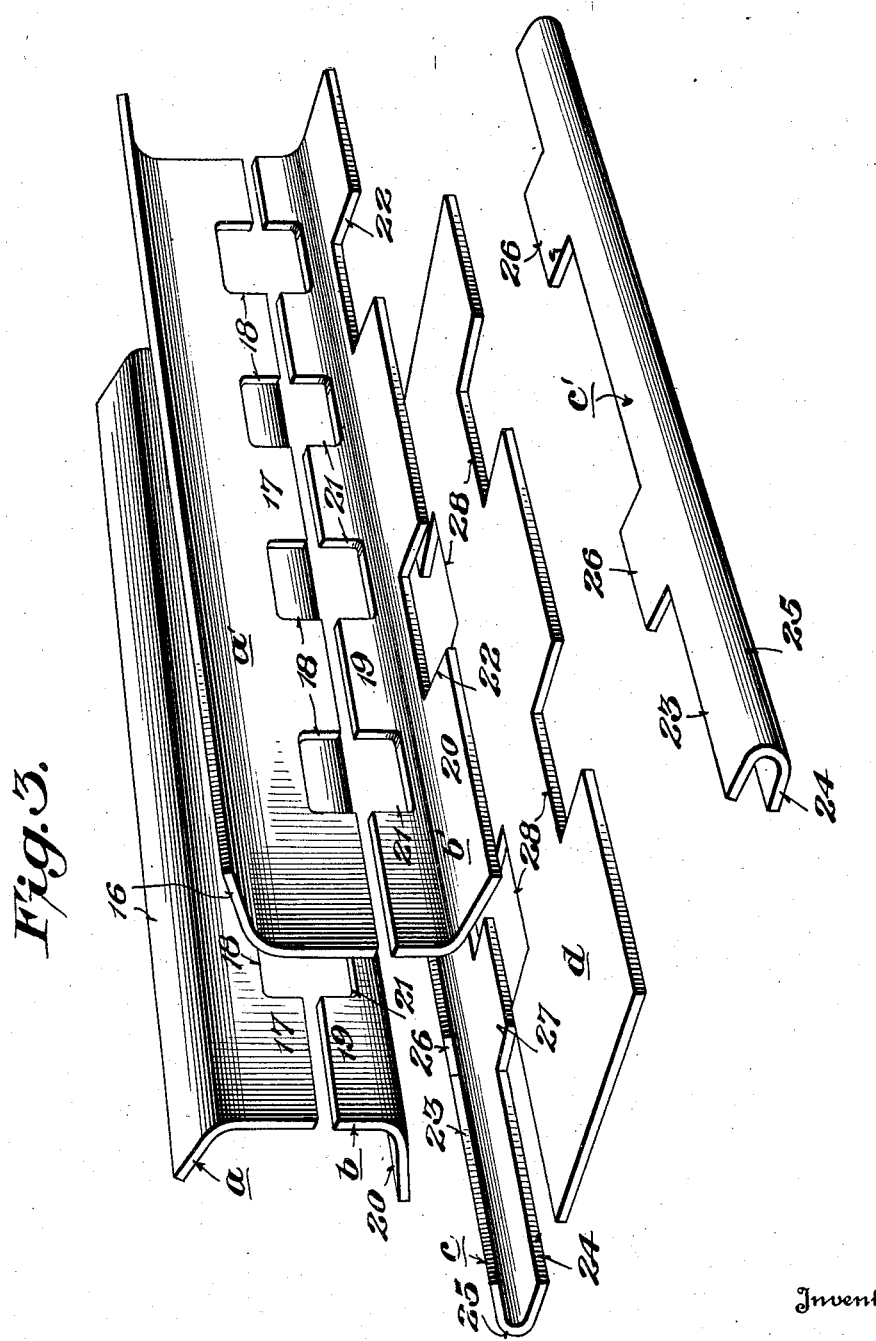

Patented July 1, 1930

1,769,651

UNITED STATES PATENT OFFICE

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK

INSULATED RAIL JOINT

Application filed April 2, 1929. Serial No. 351,941.

This invention relates to insulated rail joints, and has particular reference to improvements in the insulation for rail joints of the continuous type, i. e., joints which are inclusive of joint bars having foot flanges and base sections overlying and extending beneath the flanges of the rails, respectively; the insulation for a joint of this type generally consisting of suitable sheet dielectric material made to conform to the shape of a rail below the head thereof, whereby it is adapted for placement between the joint bars and the rails to maintain the bars and rails electrically insulated from one another.

The purpose of this invention is to construct the insulation in specially formed sections, whereby much of the difficulty now experienced in producing the necessary bends therein, and some of the fine manufacturing tolerances now required, may be avoided. Moreover, the present sectional construction of the insulation permits of increased speed and economy in manufacture; facilitates the replacement of worn sections; reduces to a minimum the number of dies and insulating sections required to be kept in stock for rails of varying sizes, and provides for an effective interlocking of the sections of insulation with one another and with the joint bolts whereby all of the sections will, in use, be prevented from creeping within and from the joint.

With the foregoing general purpose in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views;

Figure 3 is a perspective view showing the insulation sections separated from one another but in the general relative positions they occupy when incorporated in a joint.

Figure 1:
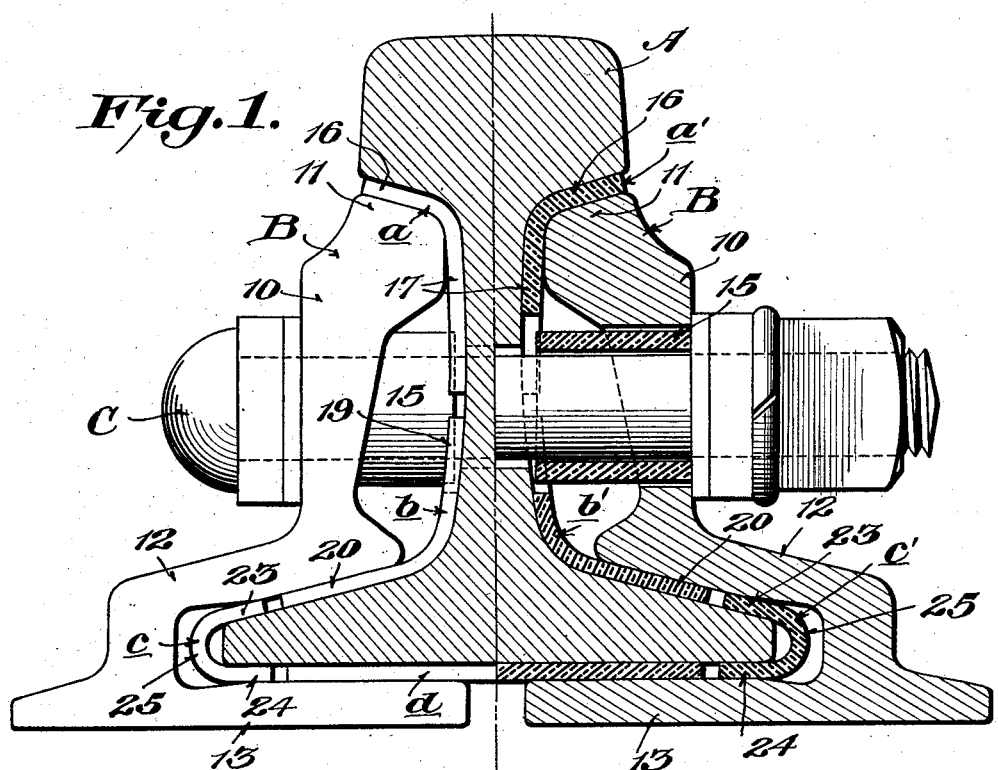
Figure 1 is a transverse section through a well known type of rail joint having the present sectional insulation embodied therein.
Figure 2:
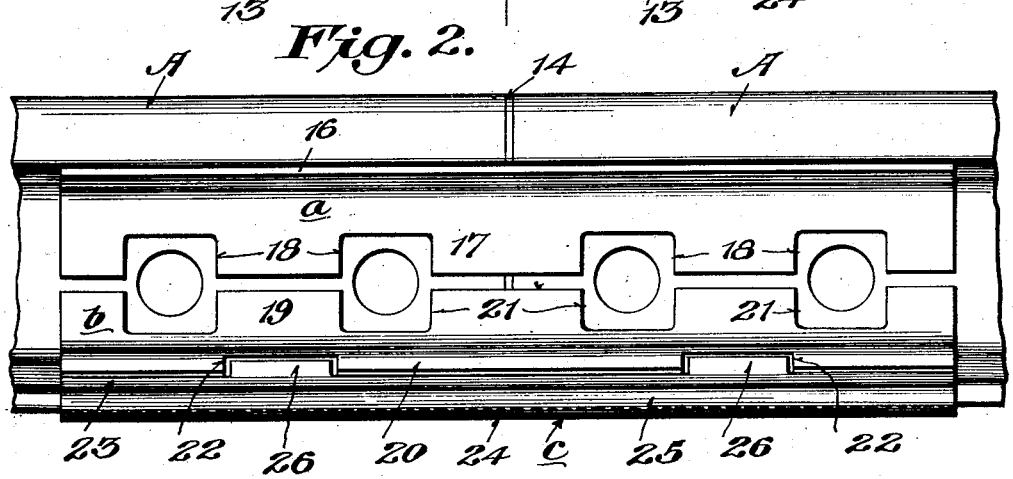
Figure 2 is a side elevation of the joint with the joint bar removed to expose the insulation.

Referring to the drawings in detail, it will be observed that the rail joint shown includes in its organization the service rails A, A, the opposite joint bars B, B, and the usual joint bolts C. All of these parts are of conventional design, the joint bars each consisting of a body portion 10 adapted to be disposed within the fishing space of the rails, a bearing head portion 11 at the top adapted to underlie the head of the rail, a foot flange portion 12 extending outwardly and inclined downwardly from the bottom of portion 10 and adapted to overlie the flange of the rail, and a horizontal rail supporting base portion 13 extending inwardly from the foot-flange portion 12 and adapted to be disposed beneath the bottom of the rail, all as is well understood by those skilled in the art.

In carrying out the present invention any suitable form of bolt and end post insulation may be employed, the end post insulation 14 consisting, for example, of a sheet of fibre or other dielectric material disposed between the meeting ends of the rails, and the bolt insulation consisting, for example, of sleeves or bushings 15 of fibre or other dielectric material arranged to surround the bolts where they extend through the bolt holes in the webs of the joint bars.

The insulation with which this invention is particularly concerned is that which is adapted to be placed between the rails A, A, and the joint bars B, B, and in accordance with the invention this insulation, considered as an entirety when viewed in end elevation, consists preferably of seven different sections herein designated $a$, $a'$, $b$, $b'$, $c$, $c'$ and $d$, respectively, each of which extends either continuously or in plural lengths the full or substantially the full length of the joint bars B. Sections $a$, $b$ and $c$ collectively constitute the insulation between one side of the rail and one of the joint bars, while sections $a'$, $b'$, $c'$ collectively constitute the insulation between the opposite side of the rail and the other joint bar. Section $d$ on the other hand constitutes the insulation between the bottom of the rail and the base portions of the joint bars and is common to the insulation at opposite sides of the rail. Head sections $a$, $a'$ which are of substantially inverted L-shape as viewed in end elevation, and which are or may be duplicates of one another, each is inclusive of a top portion 16 and a side portion 17, the top portions 16 of these sections being adapted for placement between the bearing head portions 11 of the joint bars and the under faces of the head of the rail, respectively, and the side portions 17 being adapted for placement between the upper body portions of the joint bars and the web of the rail, respectively. These latter portions preferably are of such depth that their lower edges are disposed below the tops and above the bottoms of bolts C, and they are notched as indicated at 18 to receive upper portions of said bolts whereby they are held against longitudinal movement.

The foot flange sections $b$, $b'$ which are of substantially L-shape as viewed in end elevation and which, like sections $a$, $a'$, are or may be duplicates of one another, each is inclusive of a side portion 19 and a bottom portion 20, the side portions 19 being adapted for placement between the lower body portions of the joint bars and opposite sides of the web of the rail, respectively, and the lower portions 20 being adapted for placement between the opposite upper faces of the flange of the rail and the under faces of the foot flanges of the joint bars, respectively. The side portions 19 preferably are of such height that their upper edges are disposed below the tops and above the bottoms of the bolts C and they are notched as indicated at 21 to receive lower portions of said bolts whereby, like the sections $a$, $a'$, said sections $b$, $b'$ are held against longitudinal movement. The side portions 20 on the other hand may extend any suitable distance outwardly, although preferably they terminate adjacent to but inwardly of the edges of the rail flanges where each is provided with one or more notches 22 for a purpose which will presently appear.

The cuff-pieces $c$, $c'$ which are of substantially U-shape as viewed in end elevation and which, like the head sections $a$, $a'$ and the foot flange sections $b$, $b'$, are or may be duplicates of one another, each is inclusive of an upper portion 23, a lower portion 24 and a bight or connecting portion 25. These cuff-pieces are adapted to embrace the edge portions of the rail flange, respectively, and to this end the portions 23 are adapted for placement between the opposite upper faces of the rail flange and the under faces of the foot flanges of the joint bars, respectively, the portions 24 are adapted for placement between the bottom of the rail and the upper faces of the base portions of the joint bars, respectively, and bight portions 25 are adapted to extend across the edges of the rail flange between the latter and the integrated connecting portions of the foot flanges and the base portions of the joint bars, respectively. The width of portions 23 is such that said portions form in effect continuations of the portions 20 of the foot flange sections $b$, $b'$, respectively, a tongue or tongues 26 being provided on each portion 23 to fit into a related notch 22 aforementioned whereby the cuff pieces $c$, $c'$ are held by the foot flange sections $b$, $b'$ against longitudinal movement, a similar tongue or tongues 27 being provided on each portion 24 for interlocking engagement with the base section $d$ whereby this section also is held against longitudinal movement.

The base section $d$ which consists of a flat strip of slightly less width than the rail flange, and which is adapted for placement between the bottom of the rail and the upper faces of the base portions of the joint bars, is provided along each longitudinal edge thereof with one or more notches 28 to receive the tongue or tongues 27 of the cuff pieces $c$ whereby said base section $d$ is, as aforesaid, separably interlocked with said cuff-pieces $c$.

Heretofore it has been the practice to split base section $d$ longitudinally and to form the two half sections thereof integrally with portions 24, 24 of the cuff pieces $c$, $c'$, respectively; also to form the foot flange sections $b$, $b'$ integrally with the cuff pieces $c$, $c'$, respectively. Due, however, to the relatively sharp bends at 25 and at the junction of portions 19, 20 with one another it has been necessary according to prior practice to use an expensive die to hold the material and produce these bends accurately and the process of holding and bending has been comparatively slow. By forming the foot flange and cuff pieces $b$, $c$ and $b'$, $c'$ separate from one another and separate from the base section $d$, however, the foot flange sections $b$, $b'$ may easily be bent on an ordinary cornice bender the same as is employed for bending the head sections $a$, $a'$. The cuff pieces $c$, $c'$, thus being comparatively short in their legs, may readily be bent in a smaller and cheaper die. Moreover, since the cuff pieces $c$, $c'$ are merely fillers or guards and carry no load, nor suffer any wear, they may be placed in a joint when new and need not be renewed when the other parts, which are subject to wear, need replacing. This means not only economy and increased facility in renewing but also means the avoidance of some of the fine manufacturing tolerances now required, because being merely fillers or guards, the cuff pieces $c$, $c'$ may be allowed to vary in thickness and form without suffering serious consequences.

The base section $d$, being placed under the rails, carries a great deal of the load and is subject to compression and ultimately to destruction. In bending fibre it is necessary to soak it in hot water or subject it to steam in order to soften it sufficiently to permit bending. On this account it is practically impossible to secure as hard a grade of fibre in a bent piece as in a flat piece because the latter receives its hard qualities through calendering between hot rolls and it is not practicable to calender a piece after it has been bent into the shape of the cuff pieces $c$, $c'$. This has previously meant of course, when the cuff pieces $c$, $c'$ and base section $d$ were formed integrally, that the base section $d$ was softened simultaneously with softening of the cuff pieces $c$, $c'$ to permit bending of the latter, whereas, according to the present improvements, the base section $d$ need not be subjected to the softening process.

Again, if the cuff pieces $c$, $c'$ and the base section $d$ are formed integrally with one another, according to prior practice, it is necessary to have dies for a comparatively large number of different sizes of insulation to fit various sizes of rail and joint bar sections, and to carry a stock of all of these different die-made sections, so that the amount of stock heretofore required amounted to a large total. Because of the present improvements, however, the number of different dies and stock sections may be reduced to a minimum, because different sizes of the different insulation sections, especially base sections $d$ of different widths, may be interchanged with the other sections to produce different sizes of the whole built-up structure.

Should the respective insulation sections be molded instead of bent to shape they would still possess some of the foregoing advantages, while if they are bent from flat material they would possess all of said advantages, and the various advantages would be present irrespective of which sections were provided with tongues and which sections were provided with notches to receive the tongues.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An insulated rail joint including, in combination, the rail, the side joint bars, and sectional insulation for each bar including a separate head section, a separate foot flange section, a separate base section, and a separate cuff piece.

2. An insulated rail joint including, in combination, the rail, the side joint bars, and sectional insulation for each bar including a foot flange section, a base section, and a cuff piece separably interlocked with said foot flange and base sections.

3. An insulated rail joint including, in combination, the rail, the side joint bars, and sectional insulation for each bar including a separately formed foot flange section terminating inwardly of the edge of the rail flange.

4. An insulated rail joint including, in combination, the rail, the side joint bars, and sectional insulation for each bar including a foot flange section, a cuff piece receiving the edge portion of the rail flange, and cooperating tongue and notch formations between said section and said cuff piece separably interlocking them with one another.

5. An insulated rail joint including, in combination, the rail, the side joint bars, and sectional insulation for each bar including a foot flange section, a base section, a cuff piece receiving the edge portion of the rail flange, and means separably interlocking said sections and said cuff piece with one another and with the joint bolts.

6. An insulated rail joint including, in combination, the rail, the side joint bars, and sectional insulation for each bar including a foot flange section separably interlocked with the joint bolts and a cuff piece receiving the edge portion of the rail flange and separably interlocked with the foot flange section.

7. An insulated rail joint including, in combination, the rail, the side joint bars, and sectional insulation for each bar including a base section underlying the rail, a cuff piece receiving the edge portion of the rail flange, interfitting tongue and notch formations between said base section and said cuff piece, a foot flange section overlying the rail flange, and interfitting tongue and notch formations between said cuff piece and said foot flange section, said foot flange section having notches receiving the joint bolts.

8. An insulated rail joint including in combination, the rail, the side joint bars, and sectional insulation for each joint bar including a separate head section, a separate foot flange section terminating inwardly of the edge of the rail flange, and a separate cuff piece receiving the edge portion of the rail flange.

In testimony whereof I hereunto affix my signature.

EDWARDS F. SCHERMERHORN.